Dec. 22, 1959   I. DORMAN ET AL   2,917,776
MOLDING METHOD AND APPARATUS
Filed Aug. 30, 1955   3 Sheets-Sheet 2
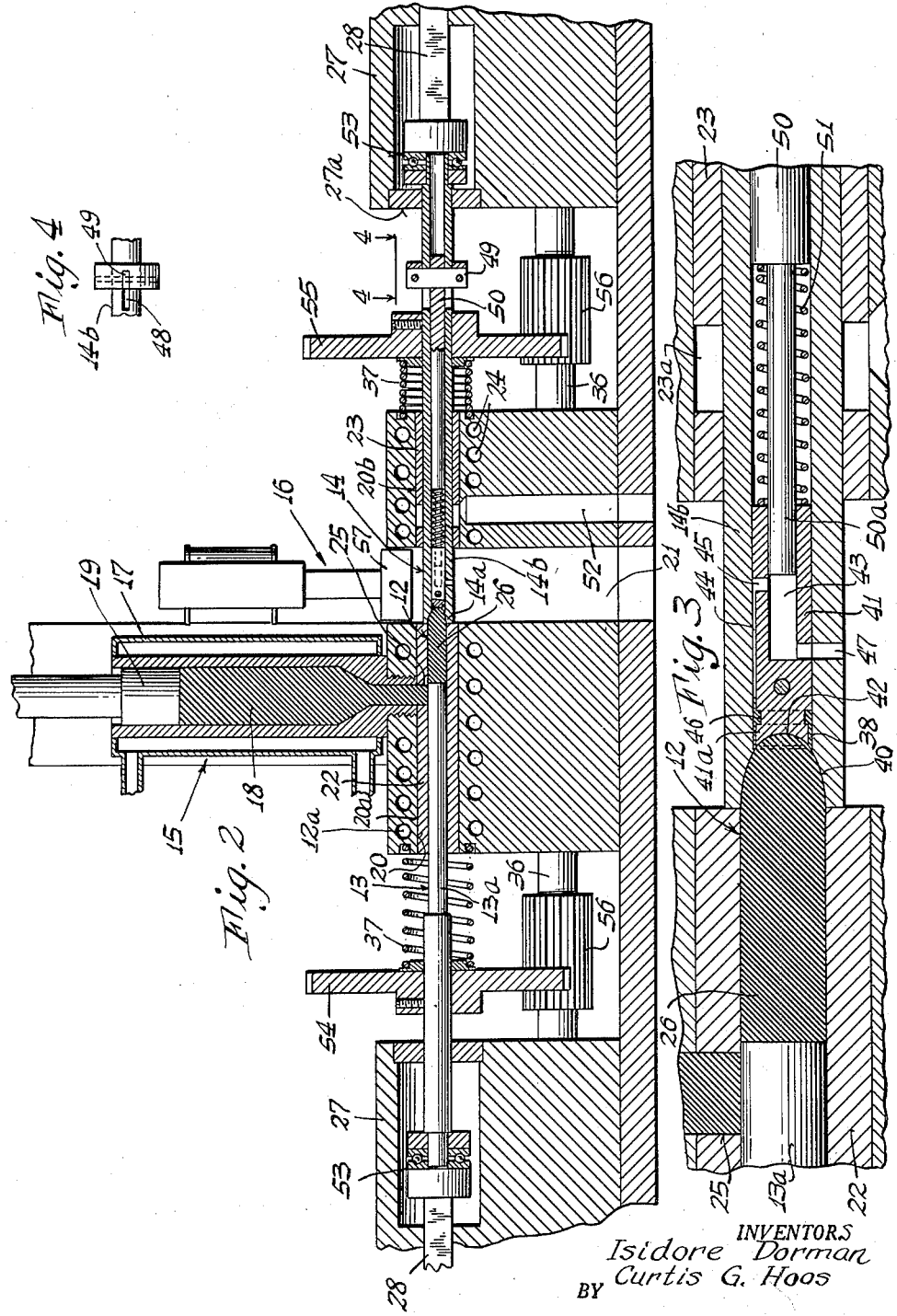
INVENTORS
Isidore Dorman
Curtis G. Hoos
BY
Johnson and Kline
ATTORNEYS

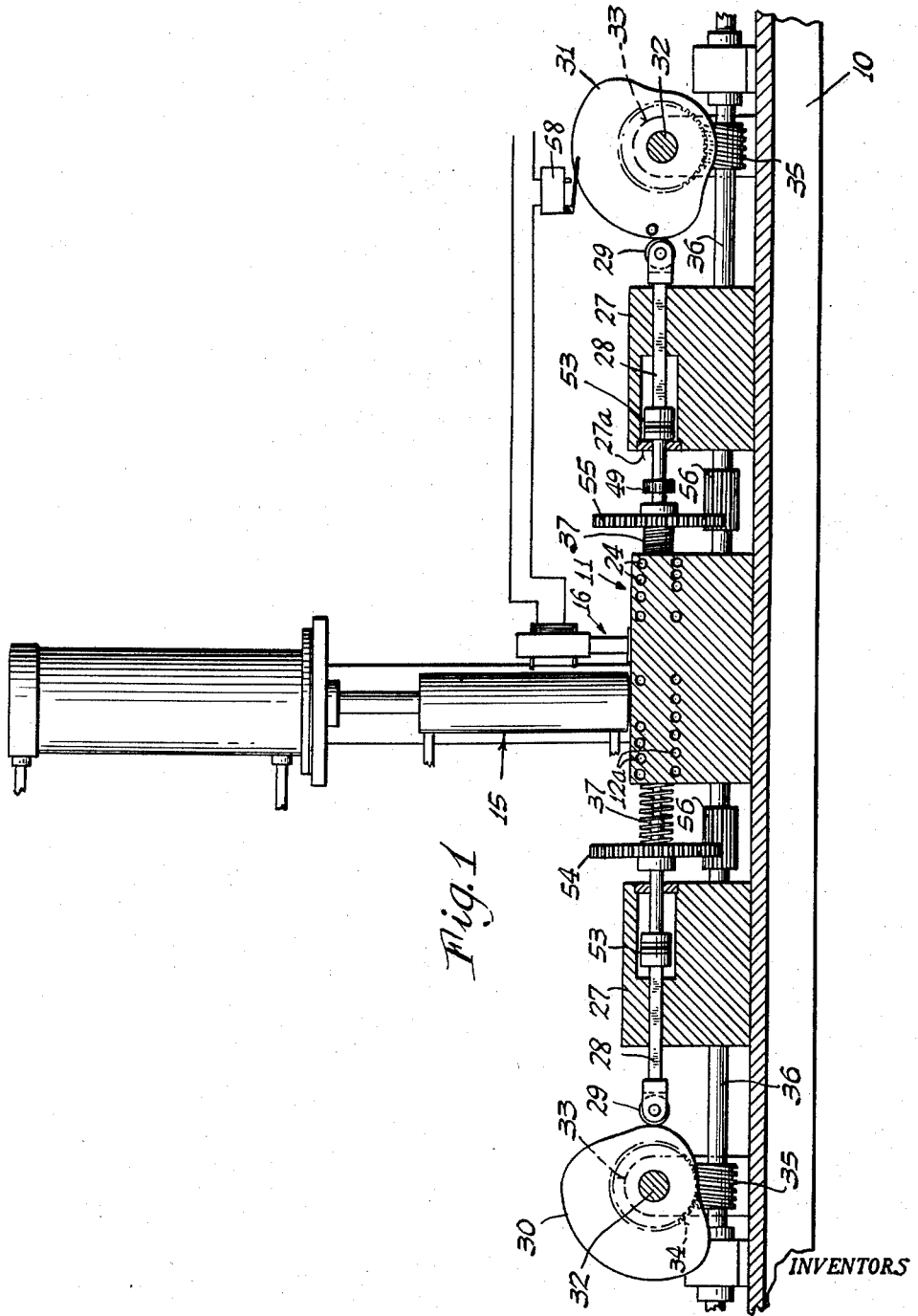

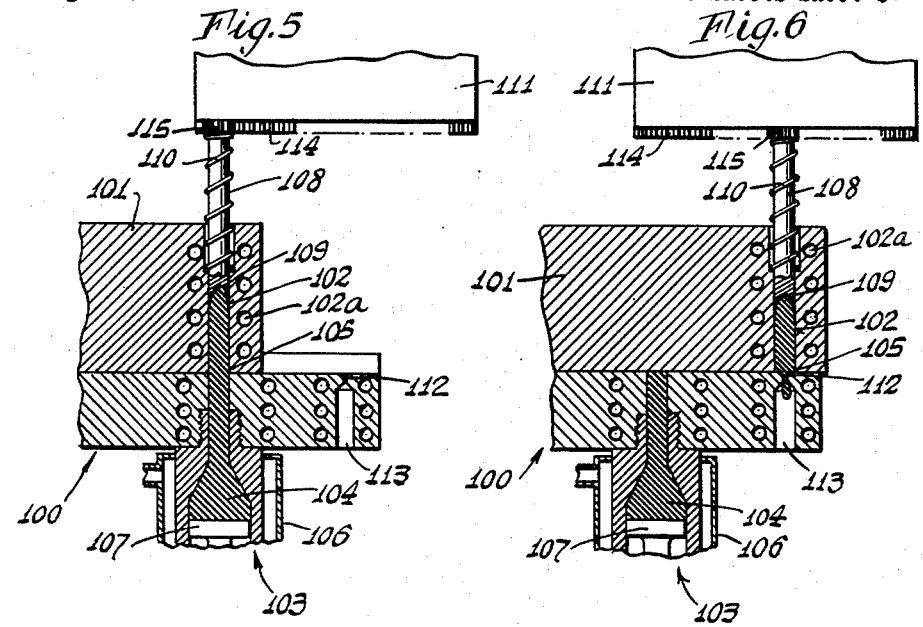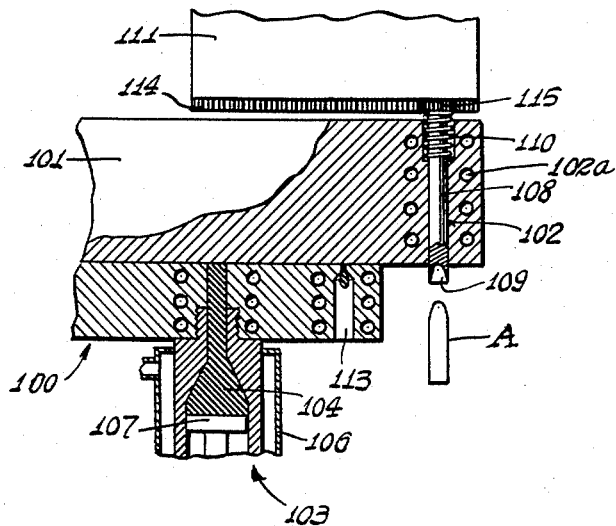

2,917,776
MOLDING METHOD AND APPARATUS

Isidore Dorman, Whitestone, and Curtis G. Hoos, Flushing, N.Y.

Application August 30, 1955, Serial No. 531,380

16 Claims. (Cl. 18—30)

This invention relates to a method and apparatus for carrying out a molding operation, and more specifically to a novel method and apparatus for molding material in a substantially solid state into an article of predetermined shape.

Heretofore, in making suppositories or other articles from unctuous material, it has been the practice to fill molds with a liquid material and permit the same to set up. This required a long setting-up period for the material and greatly reduced the speed at which the articles could be made.

The present invention overcomes this difficulty by molding the material in a substantially solid state so that it acquires the desired shape and form quickly, thus eliminating the need for a set-up time and greatly increasing the production and efficiency of the method and machine.

This is accomplished by providing one or more mold cavities of the required shape and by having a supply of the moldable material in substantially solid form communicating with the mold and adapted to be fed into the mold cavity, which cavity is closed by movable mold sections. In one form of the invention one of the movable mold sections may be used as a shut-off valve for the supply so that a measured charge is trapped in the mold and molded into the desired form, and as a pusher for moving the molded article from the mold cavity into a suitable receiver therefor.

A feature of the invention resides in providing a mold section with venting means whereby trapped air can be vented so that the mold will be filled with the moldable material and/or any excess material may be bled therefrom and scavenged.

Another feature of the invention resides in the fact that the supply of the moldable material and the molding apparatus is properly temperature controlled so that the moldable material is kept at a substantially solid but flowable state in the supply means and still, when within the mold the material is maintained in substantially the same state to enable it to be directly shaped into a self-sustaining article. When the material used is unctuous, it is preferred to rotate a movable section of the mold either through a partial rotation or complete rotation to provide a wiping action at the end of the mold to smooth off and trowel off the article into a smooth outer shape which will readily release from the mold.

Another feature of the present invention is the provision of means for positively displacing the ejected molded article from the molding chamber upon completion of the molding operation.

In another form of the invention the cavity is closed by moving the molding cavity relative to the frame wherein a pusher or die member for molding the material cooperating therewith molds, bleeds and ejects the molded article into a suitable receiver.

An important feature of the modified form of the invention resides in a movable molding chamber provided with a relatively rotatable mounted die member or plunger whereby the chamber and die member are moved relative to the frame and each other successively from a charging station, to a molding and bleeding station, and thus to a discharge or ejection station.

According to this invention a novel method comprises the steps of controlling the temperature of a supply of moldable material so that it is in a substantially solid state and barely flows as it is delivered to a molding chamber, measuring a predetermined quantity of the supply and positioning the measured quantity into a temperature controlled molding chamber to maintain the material in its said state, extruding and/or pressing the material in the molding chamber to mold the material into the desired shape, venting and bleeding the chamber of air and any excess material during the molding operation, reducing the pressure in the molding chamber prior to discharging the article, positively discharging and ejecting the molded article from the chamber by operation of the die members, and rotating one or both of the relatively movable die members to trowel or wipe the ends of the molded article to prevent adhesion of the material to the dies.

While the present method of molding can be accomplished by manual operation of the individual steps it is preferred that the method steps be carried out automatically, expediently and mechanically by an apparatus, two embodiments of which are herein illustrated. By mechanically practicing the above method a considerable saving is effected in capital, time and labor along with other definite features and advantages, as will be hereinafter set forth.

Other features and advantages will be apparent from the specification and claims when considered with the drawings in which:

Figure 1 is a front elevational view shown partly in section of a preferred form of the apparatus for carrying out an improved method of molding an article of manufacture.

Fig. 2 is an enlarged fragmentary detail sectional view of the apparatus illustrated in Fig. 1.

Fig. 3 is an enlarged fragmentary detail view shown in section of the molding chamber and the cooperating die member illustrated by Fig. 2 in the closed or molding position.

Fig. 4 is a detail top view taken along line 4—4 of Fig. 2.

Fig. 5 illustrates a modified form, partly in section, of the apparatus showing the chamber portion and related parts in material charging position.

Fig. 6 illustrates the apparatus of Fig. 5 in molding position.

Fig. 7 illustrates the apparatus of Figs. 5 and 6 in ejecting position.

While the method and apparatus herein described has utility in molding articles from any suitable molding material such as plastics, metals, powders and the like, the method and apparatus of the instant application has particular utility in the molding of an unctuous material for making suppositories and the like. Consequently to more clearly describe the invention reference will be made to the molding of an unctuous, oily, fatty material for making suppositories, although it is to be understood that the instant invention is not intended to be restricted thereto since lipsticks, candles, slugs and numerous other products can be formed thereby.

In practicing the instant method by which substantial savings and other advantages herein referred to can be had, a supply of an unctuous material for use in making suppositories is deposited in a supply means and is heated, or cooled as the case may be, to a point whereby the material is substantially solid and will barely flow. A predetermined amount of the substantially solid material is then directed to a thermostatically controlled mold, the latter having open portions or ends adapted to receive a relatively movable mold part or die members as illustrated in Figs. 1 to 4 or a single die member as illustrated in Figs. 5–7. With the material in the mold and maintained therein at its substantially solid state, the mold part or die members are moved to press the material therebetween so that it can take the shape of the molding chamber and die members or mold part. In working and maintaining the material at barely its flow point, i.e. in a substantially solid state, the set-up time is eliminated thereby increasing the speed and efficiency with which the improved method can be carried out.

During the molding operation the chamber is vented or bled and scavenged of any excess material and/or air present in the molding chamber and eliminates the same, thus insuring that all the molded articles are of uniform shape and size.

Upon completion of the molding operation the pressure in the mold is relieved by backing off a die member or mold part and the article is discharged through one end of the chamber by the respective die member or mold part.

As shown in one form of the invention, Figs. 1–4, in cases where the article does not fall freely when moved from the molding chamber, the molded article can be positively ejected by a transverse force applied to the article upon its discharge from the chamber. The transverse force thus insures the ejection of the molded article should it for any reason adhere to the advancing die member.

In order to reduce the tendency of the molded article, due to the nature of the material, from sticking to the ends of the die members to a minimum, the die members or mold part are rotated simultaneously with the relative reciprocating movements thereof during the molding operation.

According to this invention the die members or mold part can be rotated during a portion of the molding cycle, but preferably the die or dies are rotated throughout the entire molding cycle. Thus, the rotative movement of the die or dies, relative to the non-rotating moldable material in the chamber, tends to wipe or trowel the ends of the molded article to eliminate the adhesive bond between the material and the die member. Further, the rotating die members or mold part provide a smooth, finished appearance to the molded article.

While the individual steps of the above described method can be manually performed successively, it is preferred for economy, efficiency and other desirable reasons to mechanically perform the operation automatically.

According to this invention it is desirable that the foregoing method be uatomatically performed by an apparatus containing a plurality of molding stations arranged in banks, wherein each station performs the molding operation independently of the others. In this manner a plurality of articles may be simultaneously manufactured. Further, by arranging the molding stations in a bank, the finished product or article being discharged may be collected individually or collectively and wrapped, if desired, in suitable wrappers or packages. However, for the purpose of description, only one molding station will be described since it will be understood that they are all similar in structure.

One embodiment of an apparatus particularly suitab'e for automatically performing the steps of the foregoing method is illustrated in Figs. 1–4. In addition to a suitable frame or supporting structure 10 the apparatus includes a housing 11 in which there is located a thermostatically controlled molding chamber 12 and a pair of die members, preferably opposed, axially aligned. relatively movable mold sections or die members 13 and 14 which are automatically opened and closed to mold an article which in the present instance is a suppository or the like. The apparatus also includes a thermostatically controlled supply means 15 openly connected with the molding chamber, and means 16 for positively ejecting the molded article from the molding chamber. It will be understood that the supply means and molding chamber are cooperatively heated or cooled separately and individually, depending on the nature of the material being molded.

In preparing the material for molding the same into a suppository we have discovered that the molding operation, in accordance with our method and apparatus, is greatly enhanced if the moldable material is introduced into the molding chamber in a state which is substantially solid. This is accomplished by maintaining the material in the supply means in a moldable condition in which it is substantially solid and yet flowable and moldable under predetermined pressure and temperature conditions. A jacket 17 containing a thermostatically controlled heating or cooling medium surrounding the hopper has been found satisfactory to maintain the material in the desired flowable state. While the material may be introduced into the supply means either in a liquid or powder state and the temperature thereof controlled so that the material is maintained in a substantially solid state, it is preferred that the supply means be charged with a large precast slug 18 in which the temperature of the supply means is controlled to the point where the material will barely flow. By maintaining and introducing the material 18 in a substantially solid state into the molding chamber 12 which is thermostatically controlled by coil 12a, the time required to mold the article is greatly reduced thereby greatly increasing the rapidity and efficiency with which the molding operation can be carried out.

To facilitate the flow of material from the supply means 15 and into the molding chamber 12, the supply means is provided with a plunger or ram 19 which is powered by any suitable means to extrude or force the material therefrom. While the plunger or ram 19 may apply intermittent pressure on the material in the supply means, as will be hereinafter set forth, the plunger 19 maintains the material under constant pressure so as to extrude the same at the proper instant during the molding cycle.

As illustrated in Figs. 2 and 3 the housing 11 is provided with a horizontal, transverse bore 20 coextensive therewith and divided by a vertical opening 21 into a left 20a and right 20b portion. Fitted into each portion are sleeves 22 and 23 respectively, for slidably receiving the horizontally disposed die members. According to this invention the portion of the sleeve 22 immediately to the left of the vertical opening 21 functions as the molding chamber for forming the body portion of the suppositor. Also it will be noted that the right bore portion 20b is also thermostatically heated or cooled by coils 24 to maintain the shaped die at proper temperature and also to facilitate scavenging of the material as will hereinafter appear.

As illustrated in Fig. 2, the supply means 15 is positioned immediately above the molding chamber 12 and is openly connected thereto by an opening 25 adjacent one end of the molding chamber.

While the action and function of the die member to be described may be reversed, that is the right die performing the function of the left die member and vice versa, it is preferred that a pair of die members, herein illustrated as opposed, axially aligned die members 13 and 14, be slidably mounted in the housing so that one die member 13 is slidably received in the molding chamber sleeve 22 and the other die 14 reciprocally mounted in the other axially aligned sleeve 23, the inner ends of each die member forming the end walls of the molding chamber 12. According to this invention, when the die members 13 and 14 are moved to molding position, as shown in Figs. 2 and 3, the end 14a of the right die member, which is shaped to form the rounded tips of the suppository, is against the end of the molding chamber sleeve 22 and closes the end thereof. The other die member 13 is at a point beyond or to the right of the supply opening 25 to close off or valve the open end of the supply means and to mold the material 26 positioned into the chamber as shown. Thus, it will be noted that the die member 13 forms the valve element for preventing the material 18 from feeding into the molding chamber 12 during the molding stroke of the die members. If desired, the die member 13 is rendered cooperative with the plunger 19 so that timing thereof allows the plunger 19 to extrude the material only when the opening 25 is clear, i.e. when the die 13 is moved to the left thereof. According to this invention, since the material is virtually in a substantially solid, flowable, non-compressible state, the force exerted by the die member 13 is greater than the force exerted by the plunger 19, so that during the valving stroke of the die member the latter is able to close the opening 25 by overcoming the pressure on the material in the supply means which is applied by the plunger 19.

As illustrated in Figs. 1 and 2, the die members 13 and 14 consist of a pair of elongated plungers 13a and 14b which are relatively moved in a synchronous manner. While the cycle and manner in which the die members and associated elements are moved may be controlled by any suitable automatic programing means, this is accomplished in the present instance as follows: Each die respectively has one end slidably supported in a suitable bearing 27, the other end being supported in the respective sleeve. Connected to and extending beyond the outer end of each die member is an extension 28 having a roller or cam follower 29 connected thereto for engaging cams 30 and 31 respectively.

Referring to Fig. 1 the cams 30 and 31 engaging the respective cam followers 29 of the die members are eccentrically shaped substantially as shown, so that each point on the periphery of one cam has a complemental point on the other, so that the respective die member engaged by each can be predeterminately moved or positioned relative to each other in a timed sequence. To accomplish this, each cam is rotatably mounted in proper "zero" position on a shaft 32 supported by a bracket 33 positioned adjacent the outer end of each die. A gear 34 fixed to the shaft 32 and engaging a worm 35 connected to a suitable drive shaft 36 causes the cams to rotate, thus enabling the cam followers to be displaced a predetermined amount at the proper time. While each cam may be separately driven, the illustrated form utilizes a common drive shaft powered by any suitable means (not shown). Spring means 37 disposed about each die member and positioned on either side of the housing 11 urge the die members into engagement with the respective cams so that the cam follower 29 may continuously ride the contours of the cam.

An important feature of this invention is to provide means for venting and/or bleeding the molding chamber during the molding operation. Since the material is delivered to the molding chamber in a substantially solid consistency, air may be trapped in the mold. Also, it sometimes happens that an amount of material greater than that necessary is deposited in the molding chamber, in either case the finished product is rendered imperfect or unsuitable. Therefore, to overcome such difficulty means are provided by which the molding chamber can be vented or bled of any excess material and/or air which would, but for the venting and bleeding thereof, result in a rejectable article. Also, means are provided for scavenging or collecting the material bled.

While the chamber may be vented and/or bled in a number of ways, according to the illustrated form of the invention, the venting or bleeding is accomplished by providing one of the die members 14 with capillary openings 38, see Fig. 3, which communicate with the interior of the molding chamber. As shown, the shaped die member 14 consists of a hollow plunger member 14b. Referring to Figures 2 and 3, the annular end 40 of the plunger 14b is concave to provide a mold portion for molding the rounded tip of the suppository. Press fitted in the forward end of the hollow plunger 14b is a core 41, the forward end of which is provided with a concave surface 42 complementing the annular end 40.

As best viewed in Fig. 3 the diameter of the forward portion 41a of the core 41 is made slightly smaller than the interior diameter of the hollow plunger, thereby providing an annular capillary opening 38 around the forward end of the core, the annular capillary opening being either continuous or a series of small openings.

The core is further provided with a hollow portion 43 which connects with a passageway 44 through opening 45. A recessed annular groove 46 connecting the annular capillaries 38 enables the excess material and/or air to be forced through the passageway 44 and opening 45 into the hollow portion 43 and out therefrom through passageway 47.

In the event that material collects in the hollow 43, means are provided to forcibly eject the same therefrom. To accomplish this, the hollow plunger 14b is provided with a slotted opening 48, see Fig. 2, in which there is slidably mounted a flange 49 connected to an inner plunger or piston 50 slidably mounted within the hollow plunger 14b and movable relative thereto. The piston 50 is provided with a reduced portion 50a adapted to project into the space 43. A spring 51 disposed between the piston and the core normally urges the piston to the right as viewed in Fig. 3.

In order that the material, if any, accumulating in the hollow space may be ejected, the sleeve 23 is provided with an annular space 23a connecting with passageway 47. Thus, as it will be apparent, when the plunger die 14 is moved to the right as viewed in Fig. 2, the piston 50 is limited in moving to the right by the flange 49 abutting the bearing wall 27a. However, the movement of the plunger die is unobstructed thereby and continues moving to the right. This enables the plunger 39 to be moved relative to the piston 50, so that the core 41 is moved onto the forward end 50a of the piston 50 causing the latter to eject any material accumulated in the space 43 through passageway 47, into the annular space 23a and into channel 52 where it can be collected in any suitable means and reused. To facilitate removal of the material the sleeve portion 23 may be thermostatically heated or cooled by coils 24 as required to maintain the material at proper working temperatures.

Because of the general characteristic of the material used in the forming of suppositories, there is a tendency for it to adhere to the die member. To overcome this tendency, means are provided to substantially eliminate this undesirable occurrence. According to this invention, this problem has been overcome by providing means for rotating the die members relative to the material to wipe or trowel the ends of the molded article. Thus the rotating movement of the die members relative to the nonrotating material prevents the material from adhering thereto, while at the same time, provides the article with a smooth, finished appearance. While the dies may be rotated throughout any portion of the cycle, the illustrated form of the invention provides for continuous rotation thereof.

To accomplish this the die members 13 and 14 are rotatably coupled to the extension members 28 by rotatable ball bearing couplings 53, the extension member 28 being of square cross-section so that they are prevented from rotating.

While the specific means for rotating the die members may consist of a cam and pin, oscillating levers or any other suitable means, in the illustrated form of the invention the die or plunger portions are rendered rotatable relative to the extensions 28 by positioning a gear 54 and 55 thereon, as shown, which is in meshing relationship with a respective pinion gear 56 fixed to the drive shaft 36 as illustrated in Figs. 1 and 2.

Since the die members carrying gears 54 and 55 reciprocate relative to each other, the pinion gear 56 is made sufficiently wide so that the gears 54 and 55 can be longitudinally moved relative thereto while at the same time remaining in meshing relationship thereto. Thus it will be noted that since the pinion 56 and worm 35 are mounted on the same drive shaft, the plunger die members 13 and 14 are rotated as they reciprocate from open to closed and open positon. In this manner, as the article is molded and/or discharged, the die members are rotated and the relative rotative movement thereof against the non-rotative material being molded or discharged prevents substantially the adhesion of the article to the die members. Also, the rotation of the die members further enables the molded article to acquire a more smooth and finished appearance. It is to be further noted that by utilization of the gears to rotate the dies, the molding chambers and the respective die members therefor may be readily arranged in banks whereby each pair of die members can be rotated from a single drive shaft by having a plurality of gears 54 and 55 forming a gear train wherein only the end gear meshes with the pinion 56.

If desired, in order to insure that the article does not adhere to the die members, a positive ejection means is positioned adjacent the discharge end of the molding chamber so that as the molded article is discharged from the chamber, a transverse force is applied to the article which sends it through the vertical opening 21 whereby the articles can be collected and/or wrapped in saleable packages (not shown).

The means by which the transversely applied force is supplied includes a plunger or ram 57 which is mounted in line with the vertical opening 21. While the ram 57 may be actuated by any suitable means, the illustrated form is operated by a solenoid. Thus, as the article is discharging, the ram 57 is projected into the opening at the proper instant. For proper timing the cam 31 and ram 57 are connected by a suitable electrical circuit so that a switch 58 energized by the cam 31 at the proper instant causes the ram to operate.

Accordingly the operation of the foregoing apparatus is as follows:

In normal starting position the shaped die member 14 is positioned in the retracted or open position, i.e. the discharge end of the molding chamber 12 is opened and the valving die member 13 is forward, i.e. to the right beyond the opening 25 feeding the material from the hopper 15, thus closing the hopper off from the chamber 12. In this position a slug 18 of precast material is positioned into the hopper and the temperature thereof controlled until the material is substantially solid and barely at its flow point, the plunger 19 maintaining the material therein under pressure.

Upon the actuation of the drive shaft 36, cams 30 and 31 are rotated so that the shaped die member 14 is moved to closed position, i.e. closes the discharge opening of the chamber 12 and the die 13 is moved to the extreme left or charging position, thus enabling the material in the hopper to flow into the molding chamber. The die 13 dwells in its charging position for a predeterminate amount of time so that a measured quantity of the material is extruded into the chamber. At the proper timed interval the die member 13 moves to the right to a point beyond the opening 25, thus closing the opening and pressing the material so that it conforms to the chamber and die parts. Meanwhile, the die members are rotating continuously.

If any air and/or excess material is in the chamber, it will be forced out through the capillary openings 38, the air venting to the atmosphere through passage 47 and the material being bled, if any, being collected in the space 43.

Upon completion of the molding operation the die 13 is retracted slightly to reduce the pressure in the molding chamber. The shaped die member 14 is then moved to the extreme right to open position as the die 13 is moved forward, i.e. to the right, again to the end of its stroke, thus causing the molded article to be discharged from the chamber after the receding die member 14. If for any reason the molded article is adhered to the die member, the ejector 16 is time-actuated to positively knock the article off the die transversely.

Any material collected in the space 43 is forced out therefrom by the action of the piston 50 as the die member 14 is moved to extreme open position. Thus the operational cycle is completed and the device is again in its normal starting position and is readied for repeating the cycle.

The modified form of the apparatus illustrated in Figs 5–7 includes a frame 100 having a housing 101 provided with an open end chamber 102 slidably mounted thereon. A supply means 103 containing a source of suitable moldable material 104 is arranged on the frame so as to be in open communication with one end 105 of the chamber as illustrated in Fig. 5. The supply means 103 in the modified form of the invention is substantially the same as that hereinbefore described in that a thermostatically controlled jacket 106 is disposed thereabout to maintain the material at substantially solid, yet flowable and moldable condition.

If desired, a plunger 107 is positioned within the supply means to extrude the material into the molding chamber when the housing is positioned at the charging station illustrated by Fig. 5.

A die member 108 having a contoured end portion 109 to shape the end of the molded article is reciprocally mounted in the other end portion of the chamber. Spring means 110 normally urges the die members 108 into cooperating relationship to the transversely reciprocating member 111 which is connected to suitable drive means, not shown. Thus it will be noted that the reciprocating member 111 causes the die member to reciprocate in the molding chamber to perform the molding, bleeding and discharging operations successively. See Figs. 5–7.

As in the species of the apparatus hereinbefore described the molding chamber 102 is independently thermostatically controlled by coils 102a to a suitable temperature, depending on the nature of material being used, so that the material positioned therein is maintained in substantially the same state as the material in the supply means. When a predetermined amount of the material 104 is extruded from the supply means 103 and into the chamber 102, the open connection 105 between the supply means and the molding chamber is valved closed by moving the reciprocally mounted housing member 101 to the right as illustrated in Fig. 6.

As shown in the illustrated form of Fig. 6 the chamber is positioned over a bleeding means which consists of a reduced or capillary opening 112 in the frame member and connects to a suitable collecting conduit 113. In this position it will be noted that the reciprocating member 111 is depressed slightly so as to force the die member into the chamber an amount sufficient to form the material into the desired shape. After the material has been shaped and the excess material and/or air has been vented or bled through the bleeding means, the member 111 is backed off slightly to reduce the pressure in the chamber and then the housing is moved further to the right. In this position the chamber is moved beyond the edge of the frame thus exposing the open bottom end thereof as illustrated in Fig. 7. As the housing is moved to the right, the reciprocating member 111 is moved in the direction of the frame causing the die member 108 to project through the chamber, thus ejecting the molded article A. See Fig. 7.

In order to prevent adhesion of the molded article to the die member, means are provided for rotating the die member to create a wiping or troweling on the end of the molded article. While the rotation of the die member can be accomplished by any suitable means, it is herein accomplished by a rack 114 arranged on the reciprocating member 111 which engages a pinion gear 115 fixed to the upper end of the die member. Thus as the die member is moved with the housing, as illustrated, during the molding operation, the rack 114 causes the pinion 115 to rotate, thus imparting a rotative movement to the die member 108. As a result the tendency of the material to adhere to the die member is substantially eliminated.

Accordingly, it will be noted that while the structure of the illustrated forms of the apparatuses differ to some extent, the basic method hereinbefore described can be economically and efficiently performed by either apparatus.

The foregoing method and apparatuses thus enable articles and particularly suppositories to be molded quickly and easily in a more economical manner and enable the operation to be continuously and automatically performed. In addition, the apparatuses for carrying out the method are relatively simple, inexpensive to manufacture and positive in operation. There are relatively few moving parts, and all of which are readily accessible for repair and replacement. Also, the apparatuses render the improved method to be carried out completely automatically, requiring a minimum of attention on the part of an operator. Furthermore, by arranging the foregoing apparatuses in banks containing a plurality of units, a single operator can satisfactorily maintain a relatively large number of units in proper running condition. Banking the molds further facilitates the packaging operation of the articles.

Variations and modifications may be made within the scope of the claims and portions of the improvements may be used without others.

We claim:

1. A molding apparatus comprising a frame having a molding chamber provided with open ends mounted thereon for receiving a predeterminate amount of moldable material, a pair of opposed relatively movable die members operatively associated with said molding chamber and forming the end walls thereof; drive means for synchronously and successively moving said die members relative to each other to mold a material positioned in said molding chamber into a final shape and to discharge said molded article from said chamber, one of said die members comprising a shaped head portion having capillary openings and a hollow body portion forming a scavenging chamber therein open to the atmosphere, said capillary openings connecting said molding chamber with said scavenging chamber through which any excess material and/or air in said molding chamber is forced out therefrom during a molding operation and into said scavenging chamber; a plunger means slidably mounted in said die member and movable relative to said die member to force said material accumulating in said scavenging chamber outwardly therefrom as the said die members cooperate to discharge the molded article; and means adjacent the discharge end of said chamber to engage said molded article to positively eject the same.

2. A molding apparatus for shaping an unctuous material comprising a frame having a molding chamber provided with open ends; a supply means for storing a quantity of said material, said supply means being laterally displaced from but in connection with said molding chamber to charge said chamber with a predetermined amount of said material; temperature control means associated with said supply means and molding chamber whereby said material is maintained in a substantially solid state; a pair of opposed die members operatively associated with said chamber to close said open ends, said die members having opposed smooth troweling faces; driving means for successively moving said die members relative to each other to mold the material positioned in said chamber into finished form and to discharge the molded article from said molding chamber, one of said die members being adapted to valve said connection between the supply means and molding chamber and upon closing said chamber to measure a predeterminate quantity of material deposited in said molding chamber, said other die member being provided with bleeding and scavenging means for bleeding and collecting any excess material and/or air in said chamber during the molding operation; and means rotating said die members during the molding operation so that said smooth troweling faces wipe smooth the ends of the article and prevent sticking of the unctuous material to the ends of the die members when the article is ejected at the end of the molding operation.

3. In a method of molding a substantially solid material, the steps comprising maintaining the material in a substantially solid, yet moldable and flowable state, feeding the material in said state under pressure into a separate molding chamber wherein the material is maintained in substantially the same state, forming the material to the shape of the mold so that the material is shaped into a self-sustained finished article wherein the state of material remains substantially the same, smoothing the end of the article by rotating at least one part of said molding chamber having a smooth troweling face to create a wiping action during the molding operation to prevent adhesion of the molded article thereto and discharging said article from said mold.

4. In a method of molding a substantially solid material, the steps comprising maintaining the material in a substantially solid, yet moldable and flowable state, feeding the material in said state under pressure into a separate molding chamber wherein the material is maintained in substantially the same state, forming the material to the shape of the mold so that the material is shaped into a self-sustained finished article wherein the state of material remains substantially the same, smoothing the end of the article by rotating at least one part of said molding chamber having a smooth troweling face to create a wiping action during the molding operation to prevent adhesion of the molded article thereto, bleeding any excess air and/or material from the mold through at least one rotating part of said chamber, and discharging said article from said mold.

5. In a method of molding a substantially solid, yet flowable material into a self-sustained form, the steps comprising moving a quantity of said material from a supply to a laterally displaced molding chamber having open ends, bringing together a pair of opposed die members forming the end portion of said chamber, compressing the material between said die members to form a substantially self-sustained finished article, bleeding said molding chamber of any excess material and/or air therein during the formation of the material, relieving the molding pressure, and discharging said molded article from said molding chamber by coordinately advancing and receding the respective die members simultaneously whereby the advancing die member engages the molded article to force the same outwardly of said chamber.

6. A method of molding a substantially solid unctuous material, yet flowable and moldable, to form a suppository, the steps of controlling the temperature of a supply of the material so that said material is maintained in a substantially solid, yet flowable and moldable state, flowing a predetermined quantity of said supply in an open end molding chamber, bringing together a pair of opposed die members forming the end walls of said chamber, forming the material between said die members to form a self-sustained finished article, bleeding said molding chamber of any excess material and/or air during the molding of the material, discharging the molded article from said chamber by coordinately advancing and receding the respective die members simultaneously whereby the advancing die engages the molded article to force the same outwardly through an open end of the chamber, and rotating said die members relative to the article to wipe the ends of the article to prevent adhesion of the molded article to the die members.

7. A method of molding an unctuous substantially solid, yet flowable material to form a suppository, the steps of controlling the temperature and pressure of a supply of the material so that said material is maintained in said state, flowing a predetermined quantity of said supply in an open end molding chamber, controlling the temperature of the molding chamber to maintain said material in substantially the same state, bringing together a pair of opposed die members having opposed smooth troweling faces forming the end walls of said chamber to close said chamber, forming the material between said die members to shape a self-sustained finished article, bleeding said molding chamber of any excess material and/or air during the molding of the material through one of said die members, discharging the molded article from said chamber by coordinately advancing and receding the respective die members simultaneously whereby the advancing die engages the molded article to force the same outwardly, and rotating said die members relative to the article so that said smooth troweling faces wipe the ends of the article to prevent adhesion of the molded article to the die members.

8. The method as defined in claim 7 including the step of scavenging the excess material as it is bled from said chamber.

9. A method of molding a moldable material in an open end mold having a pair of axially aligned die members forming the end walls of the mold comprising the steps of accumulating a supply of moldable material which is in communication with the mold, measuring a predetermined quantity of said material, positioning the measured quantity of moldable material in the mold displaced from the supply, forming the material in said mold by relative movement of the die members, bleeding the mold of any excess material and/or air, discharging the molded finished article from said mold by coordinately advancing and receding the die members so that the advancing die members force said molded article out an open end of said mold, rotating said die members during the molding operation to prevent adhesion of the material to the ends of said die members, and positively ejecting said molded article as it is discharged from said mold.

10. A molding apparatus comprising a frame having a supply means for plastic material; a material receiving chamber disposed in open connection with said supply means; means forcing plastic material from said supply means into said receiving chamber; an open ended molding chamber spaced laterally of said supply means and in alignment with and forming a continuation of said receiving chamber; a pair of opposed die members operably associated with said molding chamber; and driving means for moving said die members relative to each other to apply molding pressure to mold material positioned in said molding chamber to form a finished article, said driving means thereafter moving one of said die members to relieve the molding pressure and then moving both of said die members to discharge the molded article therefrom, one of said die members being adapted to close an open end of said molding chamber, said other die member being adapted to move said material from said receiving chamber to said vacated molding chamber, said latter die member moving across said open connection to valve said supply means and close said other end of said molding chamber.

11. A molding apparatus comprising a frame having a supply means for plastic material; a material receiving chamber disposed in open connection with said supply means; means forcing plastic material from said supply means into said receiving chamber; an open ended molding chamber spaced laterally of said supply means and in alignment with and forming a continuation of said receiving chamber; a pair of opposed die members operably associated with said molding chamber, said die members having opposed smooth troweling faces for forming the ends of an article; driving means for moving said die members relative to each other to mold material positioned in said molding chamber and to discharge the molded article therefrom, one of said die members being adapted to close an open end of said molding chamber, said other die member being adapted to move said material from said receiving chamber to said vacated molding chamber, said latter die member moving across said open connection to valve said supply means and close said other end of said molding chamber and apply pressure to the molding material therein; and means rotating said die members during the molding operation so that said troweling faces wipe smooth the ends of the article and prevent sticking of the plastic material to the ends of the die members when the article is ejected at the end of the molding operation.

12. A molding apparatus comprising a frame having a supply means for plastic material; a material receiving chamber disposed in open connection with said supply means; means forcing plastic material from said supply means into said receiving chamber; an open ended molding chamber spaced laterally of said supply means and in alignment with and forming a continuation of said receiving chamber; a pair of opposed die members operably associated with said molding chamber, said die members having opposed smooth troweling faces for forming the ends of an article; driving means for moving said die members relative to each other to mold material positioned in said molding chamber and to discharge the molded article therefrom, one of said die members being adapted to close an open end of said molding chamber, said other die member being adapted to move said material from said receiving chamber to said vacated molding chamber, said latter die member moving across said open connection to valve said supply means and close said other end of said molding chamber; means for venting said molding chamber during the molding operation; and means rotating said die members during the molding operation so that said troweling faces wipe smooth the ends of the article and prevent sticking of the plastic material to the ends of the die members when the article is ejected at the end of the molding operation.

13. A molding apparatus comprising a frame having a supply means for plastic material; a material receiving chamber disposed in open connection with said supply means; means forcing plastic material from said supply means into said receiving chamber; an open ended molding chamber spaced laterally of said supply means and in alignment with and forming a continuation of said receiving chamber; a pair of opposed die members operably associated with said molding chamber, said die members having opposed smooth troweling faces for forming the ends of an article; one of said die members having capillary openings therein cooperating with said molding chamber and a hollow body portion opened to the atmosphere, said capillary openings connecting said chamber with said hollow body portion through which any excess material and/or air in said molding chamber is forced out during a molding operation; driving means for moving said die members relative to each other to mold material positioned in said molding chamber and to discharge the molded article therefrom, one of said die members being adapted to close an open end of said molding chamber, said other die member being adapted to move said material from said receiving chamber to said vacated molding chamber, said latter die member moving across said open connection to valve said supply means and close said other end of said molding chamber; and means rotating said die members during the molding operation so that said troweling faces wipe smooth the ends of the article and prevent sticking of the plastic material to the ends of the die members when the article is discharged from the molding chamber.

14. A molding apparatus as in claim 12, wherein said die member having said capillary openings therein is formed with a shaped head portion for shaping an end of the article during the molding operation.

15. A molding apparatus comprising a frame having a supply means for plastic material; a material receiving chamber disposed in open connection with said supply means; pressure means forcing plastic material from said supply means into said receiving chamber; an open ended molding chamber spaced laterally of said supply means and in alignment with and forming a continuation of said receiving chamber; a pair of opposed die members operably associated with said molding chamber, said die members having opposed smooth troweling faces for forming the ends of an article; and one of said members having bleeding and/or scavenging openings therein through which excess material and/or air in said molding chamber is forced out during the molding operation; driving means for moving said die members relative to each other to mold material positioned in said molding chamber and then with each other to discharge the molded article therefrom, one of said die members being adapted to close an open end of said molding chamber, said other die member being adapted to move said material from said receiving chamber to said vacated molding chamber, said latter die member moving across said open connection to valve said supply means and close said other end of said molding chamber; means rotating said die members during the molding operation so that said troweling faces wipe smooth the ends of the article and prevent sticking of the plastic material to the ends of the members when the article is discharged from the molding chamber; and plunger means moving transversely of said die members for ejecting the molded article retained therebetween when said members have removed the same from said molding chamber.

16. A molding apparatus as in claim 14, wherein said driving means includes a pair of eccentric cams, said cams being adapted to act on the ends of the die members to synchronously move the same in the molding and discharging operations.

References Cited in the file of this patent

UNITED STATES PATENTS

| | | |
|---|---|---|
| 1,943,477 | Haserodt | Jan. 16, 1934 |
| 2,301,338 | Smith | Nov. 10, 1942 |
| 2,329,288 | Miller | Sept. 14, 1943 |
| 2,404,559 | Ashbaugh | July 23, 1946 |
| 2,507,491 | Crea | May 16, 1950 |
| 2,570,989 | Seelig | Oct. 9, 1951 |
| 2,629,132 | Willcox et al. | Feb. 24, 1953 |
| 2,705,835 | Massmann | Apr. 12, 1955 |
| 2,737,686 | Harkenrider | Mar. 13, 1956 |